US011785489B2

(12) United States Patent
Li et al.

(10) Patent No.: US 11,785,489 B2
(45) Date of Patent: Oct. 10, 2023

(54) APPARATUS, METHOD AND COMPUTER PROGRAM FOR SELF-ORGANIZING NETWORK MEASUREMENT REPORTING (71) Applicant: Nokia Technologies Oy, Espoo (FI)

(72) Inventors: Haitao Li, Beijing (CN); Srinivasan Selvaganapathy, Bangalore (IN); Jussi-Pekka Koskinen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 136 days.

(21) Appl. No.: 17/265,258

(22) PCT Filed: Sep. 25, 2018

(86) PCT No.: PCT/CN2018/107330
§ 371 (c)(1),
(2) Date: Feb. 2, 2021

(87) PCT Pub. No.: WO2020/061746
PCT Pub. Date: Apr. 2, 2020

(65) Prior Publication Data
US 2021/0306892 A1 Sep. 30, 2021

(51) Int. Cl.
H04W 24/10 (2009.01)
H04W 76/27 (2018.01)
(Continued)

(52) U.S. Cl.
CPC .......... H04W 24/10 (2013.01); H04L 1/0038 (2013.01); H04W 76/27 (2018.02); H04W 80/02 (2013.01); H04W 84/18 (2013.01)

(58) Field of Classification Search
CPC ..... H04W 24/10; H04W 76/27; H04W 80/02; H04W 84/18; H04W 24/02; H04W 48/12; H04W 74/0833; H04L 1/0038
See application file for complete search history.

(56) References Cited

U.S. PATENT DOCUMENTS

2011/0151881 A1* 6/2011 Chou .................... H04W 16/12
455/447
2014/0341116 A1 11/2014 Chen et al.
2015/0288566 A1 10/2015 Sadek

FOREIGN PATENT DOCUMENTS

CN 101616423 A 12/2009
CN 102647741 A 8/2012
(Continued)

OTHER PUBLICATIONS

"New WID on Rel-16 enhancements for NB-IoT", 3GPP TSG RAN Meeting #80, RP-181451, Agenda : 10.1.3, Ericsson, Jun. 11-14, 2018, 4 pages.
(Continued)

Primary Examiner — Chuong A Ngo
(74) Attorney, Agent, or Firm — SQUIRE PATTON BOGGS (US) LLP (57) ABSTRACT Apparatus comprising means for performing: performing self-organizing network measurements to generate self-organizing network measurement information; and in response to determining that the apparatus has user data to transmit to a base station, determining whether the self-organizing network measurement information can be accommodated in a message together with the user data.

16 Claims, 8 Drawing Sheets (51) Int. Cl.
  *H04L 1/00*   (2006.01)
  *H04W 80/02*  (2009.01)
  *H04W 84/18*  (2009.01)

(56) References Cited

FOREIGN PATENT DOCUMENTS

| | | |
|---|---|---|
| CN | 102761890 A | 10/2012 |
| JP | 2016063376 A | 4/2016 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.2.2, Jun. 2018, pp. 1-791.

International Search Report and Written Opinion received for corresponding Patent Cooperation Treaty Application No. PCT/CN2018/107330, dated Jun. 24, 2019, 9 pages.

Extended European Search Report received for corresponding European Patent Application No. 18935278.4, dated Feb. 10, 2022, 13 pages.

"Early Data Transmission on Preconfigured UL Resources in NB-IoT", 3GPP TSG RAN WG1 Meeting #94, R1-1808960, Agenda: 6.2.2.2 , MediaTek Inc., Aug. 20-24, 2018, 4 pages.

"SON measurements and reporting for NB-IoT", 3GPP TSG-RAN WG2 Meeting #103bis, R2-1814412, Agenda: 12.2.6, Nokia, Oct. 8-12, 2018 , 2 pages.

European Communication pursuant to Article 94(3) EPC, corresponding to EP 18 935 278.4, dated Aug. 7, 2023.

Alcatel-Lucent et al., "Inter-Cell Interference Co-ordination SON Use Case", 3GPP TSG RAN3#60, Kansas City, Missouri, US, May 5-9, 2008, R3-081530, 3 pages.

* cited by examiner

APPARATUS, METHOD AND COMPUTER PROGRAM FOR SELF-ORGANIZING NETWORK MEASUREMENT REPORTING

RELATED APPLICATION

This application was originally filed as PCT Application No. PCT/CN2018/107330 on Sep. 25, 2018, which is hereby incorporated in its entirety.

FIELD

This disclosure relates to communications, and more particularly to an apparatus, method and computer program in a wireless communication system. More particularly the present invention relates to the communication of self-organizing network measurement information.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices.

A communication network may comprise one or more Internet of Things (IoT) devices. IoT devices may communicate with each other and/or with the wider network using one or more technologies and/or standards. One such standard is the NarrowBand Internet of Things (NB-IoT) standard. NB-IoT is a standards-based low power wide area (LPWA) technology developed to enable a wide range of IoT devices and services.

STATEMENT OF INVENTION

According to a first aspect there is provided an apparatus comprising means for performing: performing self-organizing network measurements to generate self-organizing network measurement information; and in response to determining that the apparatus has user data to transmit to a base station, determining whether the self-organizing network measurement information can be accommodated in a message together with the user data.

According to some examples, the means are further configured to perform comparing a total size of the self-organizing network measurement information and the user data with an allocated transport block size for the message, when determining whether the self-organizing network measurement information can be accommodated in the message together with the user data.

According to some examples, the means are further configured to perform sending the user data and the self-organizing network measurement information together in the message to the base station, when it is determined that the self-organizing network measurement information can be accommodated in the message together with the user data.

According to some examples, the means are further configured to perform sending an indication to the base station that the apparatus has self-organizing network measurement information to send, without sending the self-organizing network measurement information along with the indication, when it is determined that the self-organizing network measurement information cannot be accommodated in the message together with the user data.

According to some examples, the means are further configured to perform subsequently sending the self-organizing network measurement information to the base station at a predetermined time as part of an early data transmission, when it is determined that the apparatus has no user data to transmit to the base station.

According to some examples, the message comprises a radio resource control early data request message, or a radio resource control connection resume request message, or a media access control element, sent as part of early data transmission.

According to some examples, the message comprises a Msg3.

According to some examples the self-organizing network comprises a narrowband internet of things network.

According to some examples, the means comprises: at least one processor; and at least one memory including computer program code, the at least one memory and computer program code configured to, with the at least one processor, cause the performance of the apparatus.

According to some examples, the apparatus comprises a user equipment.

According to a second aspect there is provided an apparatus comprising at least one processor; and at least one memory including computer program code; the at least one memory and the computer program code configured to, with the at least one processor, cause the apparatus at least to perform: performing self-organizing network measurements to generate self-organizing network measurement information; and in response to determining that the apparatus has user data to transmit to a base station, determining whether the self-organizing network measurement information can be accommodated in a message together with the user data.

According to some examples, the at least one memory and the computer program code configured to, with the at least one processor, cause the apparatus at least to perform comparing a total size of the self-organizing network measurement information and the user data with an allocated transport block size for the message, when determining whether the self-organizing network measurement information can be accommodated in the message together with the user data.

According to some examples, the at least one memory and the computer program code configured to, with the at least one processor, cause the apparatus at least to perform sending the user data and the self-organizing network measurement information together in the message to the base station, when it is determined that the self-organizing network measurement information can be accommodated in the message together with the user data.

According to some examples, the at least one memory and the computer program code configured to, with the at least one processor, cause the apparatus at least to perform sending an indication to the base station that the apparatus has self-organizing network measurement information to send, without sending the self-organizing network measurement information along with the indication, when it is determined that the self-organizing network measurement information cannot be accommodated in the message together with the user data.

According to some examples, the at least one memory and the computer program code configured to, with the at least one processor, cause the apparatus at least to perform subsequently sending the self-organizing network measurement information to the base station at a predetermined time as part of an early data transmission, when it is determined that the apparatus has no user data to transmit to the base station.

According to some examples, the message comprises a radio resource control early data request message, or a radio resource control connection resume request message, or a media access control element, sent as part of early data transmission.

According to some examples, the message comprises a Msg3.

According to some examples the self-organizing network comprises a narrowband internet of things network.

According to some examples, the apparatus comprises a user equipment.

According to a third aspect there is provided an apparatus comprising: measuring circuitry for performing self-organizing network measurements to generate self-organizing network measurement information; determining circuitry for determining whether the self-organizing network measurement information can be accommodated in a message together with the user data, in response to determining that the apparatus has user data to transmit to a base station.

According to a fourth aspect there is provided an apparatus comprising means for performing: indicating to a user equipment that reporting by the user equipment of self-organizing network measurement information together in a message with user data is supported by the apparatus; and in response to the indicating, receiving self-organizing network information from the user equipment.

According to some examples, the indicating to a user equipment comprises indicating one or more report types to the user equipment, the one or more report types comprising information of a preference of the apparatus for receiving the self-organizing network measurement information.

According to some examples, the preference of the apparatus comprises one or more of: receiving the self-organizing network measurement information together in a message with user data; receiving the self-organizing network measurement information via dedicated signalling without user data.

According to some examples, the self-organizing network information received from the user equipment comprises self-organizing network measurement information together in a message with user data.

According to some examples, the means are further configured to perform receiving the message as a radio resource control early data request message, or a radio resource control connection resume request message, or a media access control element, received as part of early data transmission.

According to some examples, the message comprises a Msg3.

According to some examples, the received self-organizing network information comprises an indication that the user equipment has self-organizing network measurement information to send.

According to some examples, the means are further configured to cause establishment of radio resource control connection set-up, so that the apparatus can receive the self-organizing network measurement information from the user equipment.

According to some examples, the means are further configured to perform configuring a maximum transport block size for reporting of the self-organizing network measurement information, the configuring a maximum transport block size comprising selecting the maximum transport block size from a plurality of available transport block sizes.

According to some examples, the means are further configured to perform configuring the maximum transport block size when it is determined by the apparatus that a configured transport block size for early data transmission is larger than the maximum transport block size.

According to some examples, the means are further configured to perform blind decoding of received self-organizing network measurement information.

According to some examples, the means are further configured to perform blind decoding of self-organizing network measurement information received from multiple user equipment.

According to some examples, the means comprises: at least one processor; and at least one memory including computer program code, the at least one memory and computer program code configured to, with the at least one processor, cause the performance of the apparatus.

According to some examples, the apparatus comprises a base station.

According to a fifth aspect, there is provided an apparatus comprising at least one processor; and at least one memory including computer program code; the at least one memory and the computer program code configured to, with the at least one processor, cause the apparatus at least to perform: indicating to a user equipment that reporting by the user equipment of self-organizing network measurement information together in a message with user data is supported by the apparatus; and in response to the indicating, receiving self-organizing network information from the user equipment.

According to some examples, the indicating to a user equipment comprises indicating one or more report types to the user equipment, the one or more report types comprising information of a preference of the apparatus for receiving the self-organizing network measurement information.

According to some examples, the preference of the apparatus comprises one or more of: receiving the self-organizing network measurement information together in a message with user data; receiving the self-organizing network measurement information via dedicated signalling without user data.

According to some examples, the self-organizing network information received from the user equipment comprises self-organizing network measurement information together in a message with user data.

According to some examples, the at least one memory and the computer program code configured to, with the at least one processor, cause the apparatus at least to perform receiving the message as a radio resource control early data request message, or a radio resource control connection resume request message, or a media access control element, received as part of early data transmission.

According to some examples, the message comprises a Msg3.

According to some examples, the received self-organizing network information comprises an indication that the user equipment has self-organizing network measurement information to send.

According to some examples, the at least one memory and the computer program code configured to, with the at least one processor, cause the apparatus at least to perform causing establishment of radio resource control connection set-up, so that the apparatus can receive the self-organizing network measurement information from the user equipment.

According to some examples, the at least one memory and the computer program code configured to, with the at least one processor, cause the apparatus at least to perform configuring a maximum transport block size for reporting of the self-organizing network measurement information, the configuring a maximum transport block size comprising selecting the maximum transport block size from a plurality of available transport block sizes.

According to some examples, the at least one memory and the computer program code configured to, with the at least one processor, cause the apparatus at least to perform configuring the maximum transport block size when it is determined by the apparatus that a configured transport block size for early data transmission is larger than the maximum transport block size.

According to some examples, the at least one memory and the computer program code configured to, with the at least one processor, cause the apparatus at least to perform blind decoding of received self-organizing network measurement information.

According to some examples, the at least one memory and the computer program code configured to, with the at least one processor, cause the apparatus at least to perform blind decoding of self-organizing network measurement information received from multiple user equipment.

According to some examples, the apparatus comprises a base station.

According to a sixth aspect there is provided an apparatus comprising indicating circuitry for indicating to a user equipment that reporting by the user equipment of self-organizing network measurement information together in a message with user data is supported by the apparatus; and receiving circuitry for receiving self-organizing network information from the user equipment in response to the indicating.

According to a seventh aspect there is provided a method comprising: performing self-organizing network measurements at an apparatus to generate self-organizing network measurement information; and in response to determining that the apparatus has user data to transmit to a base station, determining whether the self-organizing network measurement information can be accommodated in a message together with the user data.

According to some examples, the method comprises comparing a total size of the self-organizing network measurement information and the user data with an allocated transport block size for the message, when determining whether the self-organizing network measurement information can be accommodated in the message together with the user data.

According to some examples, the method comprises sending the user data and the self-organizing network measurement information together in the message to the base station, when it is determined that the self-organizing network measurement information can be accommodated in the message together with the user data.

According to some examples, the method comprises sending an indication to the base station that the apparatus has self-organizing network measurement information to send, without sending the self-organizing network measurement information along with the indication, when it is determined that the self-organizing network measurement information cannot be accommodated in the message together with the user data.

According to some examples, the method comprises subsequently sending the self-organizing network measurement information to the base station at a predetermined time as part of an early data transmission, when it is determined that the apparatus has no user data to transmit to the base station.

According to some examples, the message comprises a radio resource control early data request message, or a radio resource control connection resume request message, or a media access control element, sent as part of early data transmission.

According to some examples, the message comprises a Msg3.

According to some examples, the self-organizing network comprises a narrowband Internet of things network.

According to some examples, the method is performed by a user equipment.

According to an eighth aspect there is provided a computer program comprising instructions for causing an apparatus to perform at least the following: performing self-organizing network measurements at the apparatus to generate self-organizing network measurement information; and in response to determining that the apparatus has user data to transmit to a base station, determining whether the self-organizing network measurement information can be accommodated in a message together with the user data.

According to a ninth aspect there is provided a computer program comprising instructions stored thereon for performing at least the following: performing self-organizing network measurements at the apparatus to generate self-organizing network measurement information; and in response to determining that the apparatus has user data to transmit to a base station, determining whether the self-organizing network measurement information can be accommodated in a message together with the user data.

According to a tenth aspect there is provided a non-transitory computer readable medium comprising program instructions for causing an apparatus to perform at least the following: performing self-organizing network measurements at the apparatus to generate self-organizing network measurement information; and in response to determining that the apparatus has user data to transmit to a base station, determining whether the self-organizing network measurement information can be accommodated in a message together with the user data.

According to an eleventh aspect there is provided a non-transitory computer readable medium comprising program instructions stored thereon for performing at least the following: performing self-organizing network measurements at the apparatus to generate self-organizing network measurement information; and in response to determining that the apparatus has user data to transmit to a base station, determining whether the self-organizing network measurement information can be accommodated in a message together with the user data.

According to a twelfth aspect there is provided a method comprising: indicating by an apparatus to a user equipment that reporting by the user equipment of self-organizing network measurement information together in a message with user data is supported by the apparatus; and in response to the indicating, receiving self-organizing network information from the user equipment.

According to some examples, the indicating to a user equipment comprises indicating one or more report types to the user equipment, the one or more report types comprising information of a preference of the apparatus for receiving the self-organizing network measurement information.

According to some examples, the preference of the apparatus comprises one or more of: receiving the self-organizing network measurement information together in a message with user data; receiving the self-organizing network measurement information via dedicated signalling without user data.

According to some examples, the self-organizing network information received from the user equipment comprises self-organizing network measurement information together in a message with user data.

According to some examples, the method comprises receiving the message as a radio resource control early data request message, or a radio resource control connection resume request message, or a media access control element, received as part of early data transmission.

According to some examples, the message comprises a Msg3.

According to some examples, the received self-organizing network information comprises an indication that the user equipment has self-organizing network measurement information to send.

According to some examples, the method comprises causing establishment of radio resource control connection set-up, so that the apparatus can receive the self-organizing network measurement information from the user equipment.

According to some examples, the means are further configured to perform configuring a maximum transport block size for reporting of the self-organizing network measurement information, the configuring a maximum transport block size comprising selecting the maximum transport block size from a plurality of available transport block sizes.

According to some examples, the method comprises configuring the maximum transport block size when it is determined by the apparatus that a configured transport block size for early data transmission is larger than the maximum transport block size.

According to some examples, the method comprises performing blind decoding of received self-organizing network measurement information.

According to some examples, the method comprises performing blind decoding of self-organizing network measurement information received from multiple user equipment.

According to some examples, the method is performed by a base station.

According to a thirteenth aspect, there is provided a computer program comprising instructions for causing an apparatus to perform at least the following: indicating by the apparatus to a user equipment that reporting by the user equipment of self-organizing network measurement information together in a message with user data is supported by the apparatus; and in response to the indicating, receiving self-organizing network information from the user equipment.

According to a fourteenth aspect, there is provided a computer program comprising instructions stored thereon for performing at least the following: indicating by the apparatus to a user equipment that reporting by the user equipment of self-organizing network measurement information together in a message with user data is supported by the apparatus; and in response to the indicating, receiving self-organizing network information from the user equipment.

According to a fifteenth aspect, there is provided a non-transitory computer readable medium comprising program instructions for causing an apparatus to perform at least the following: indicating by the apparatus to a user equipment that reporting by the user equipment of self-organizing network measurement information together in a message with user data is supported by the apparatus; and in response to the indicating, receiving self-organizing network information from the user equipment.

According to a sixteenth aspect, there is provided a non-transitory computer readable medium comprising program instructions stored thereon for performing at least the following: indicating by the apparatus to a user equipment that reporting by the user equipment of self-organizing network measurement information together in a message with user data is supported by the apparatus; and in response to the indicating, receiving self-organizing network information from the user equipment.

BRIEF DESCRIPTION OF FIGURES

The invention will now be described in further detail, by way of example only, with reference to the following examples and accompanying drawings, in which.

DETAILED DESCRIPTION

Figure 1:
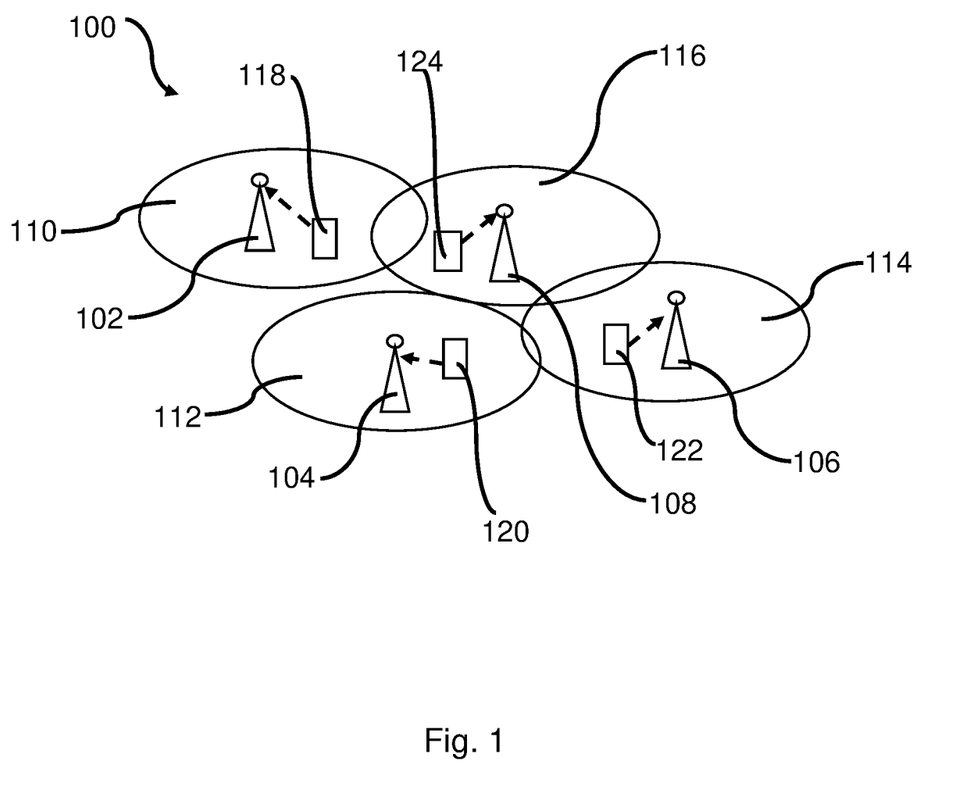
FIG. 1 shows a schematic example of some parts of a wireless communication system where the invention may be implemented.

FIG. 1 shows an example of a self-organizing network (SON) 100. The SON 100 comprises base stations 102, 104, 106, and 108 serving respective cells 110, 112, 114 and 116. In this example base station 108 comprises a newly added base station. The base stations may for example be eNBs. A feature of the SON network is that the newly added base station 108 will self-configure. That is the base station 108 will by itself configure the physical cell identity (PCI). The base station 108 may also self-configure its transmission frequency and power. To reduce manual work automatic neighbour relations (ANR) may also be used. ANR configures the neighbouring list in newly deployed eNBs and may optimize list configuration during operation. Dynamic configuration may include the configuration of the Layer 1 (L1) identifier, Physical cell identity (PCI) and Cell global ID (CGID). The PCI can be assigned either in a centralized or distributed way.

The network 100 of FIG. 1 may comprise one or more devices. These are schematically shown at 118, 120, 122 and 124. One or more of these devices may comprise an IoT device. One or more of these devices may comprise a UE.

It has been proposed to enhance network management. More specifically it has been proposed that there is SON support for reporting one or more of: CGID and strongest measured cell(s) (ANR); random access (RA) performance; radio link failure (RLF), if needed.

As will be discussed in more detail below, this application proposes an Early Data Transmission (EDT) enhancement in NB-IoT to support SON reporting. EDT is a mechanism for sending small amounts of data. For example EDT may involve sending small amounts of data on Msg3. Msg3 is one of the messages in the random access (RA) procedure for initial access. One aim of the proposal is to have minimal impact on energy consumption of IoT devices and network signalling overhead.

In some examples, EDT comprises data transmission during the random access (RA) procedure. This may improve IoT device battery life and reduce message latency.

The ANR feature of SON functionality in LTE works based on connected mode UE measurements reporting the PCIs, followed by UE reporting the CGID of selected PCI. Based on these reports the base station builds a neighbour relationship table for each neighbouring PCI and CGID. For CGID reporting the UE needs to synchronise and read specific system information of the target PCI, and return back to the serving cell in connected mode. This mechanism takes additional time, and also involves the UE switching to another cell in connected mode and then returning back to the serving cell.

A MDT (Minimization of Drive Test) feature of SON functionality in LTE includes immediate MDT and Logged MDT. Immediate MDT works in a similar way to the ANR feature based on connected mode UE measurements. Logged MDT is based mainly on Idle mode UE measurements, and its reporting relies on available RRC connection as the reporting is to be carried over signalling radio bearer 2 (SRB2) with lower priority than SRB1.

In NB-IoT networks, connected mode mobility and connected mode UE measurements are not supported. Therefore, not all SON functions may be required for NB-IoT, at least not necessarily in the same way as LTE. In deep enhanced coverage, NB-IoT may require a large number of transmission repetitions used for signalling exchange for connection setup and data transmission. Accordingly SON function may be considered as an add-on feature, and should not contradict the power saving nature of IoT devices.

Accordingly some examples propose an enhanced EDT procedure to support SON reporting. The proposed procedure optimizes UE power saving and signalling overhead reduction.

According to some examples, the base station (e.g. eNB) allocates fixed sizes of TBS to one or more UEs without knowing the actual payload that needs to be transmitted by those one or more UEs. A plurality of different TBS sizes may be allocated.

When a UE has some data to send the UE selects the TBS size closest to the payload size which the UE wants to transmit.

In some cases, there will be padding required to fill the TBS size after the actual user data has been accommodated.

According to some examples, depending on the available free space in the EDT TBS, SON related reports may be placed in the "spare" part of the EDT TBS (i.e. the amount that is spare after user data has been placed therein). For example the SON related reports may comprise SON measurement information. The SON related reports may also comprise further information including one or more of: information of strongest PCI; CGI for one or more selected PCIs; RA failure report; RLF (radio link failure) report. More particularly the SON related reports (and the user data) may be placed inside the Msg3 message.

According to some examples, if the UE does not have any user data to send, but does have one or more SON reports to send, the described EDT mechanism can still be used, just without sending of user data. In such examples an allocated TBS may still be used. Such examples may require a relatively large amount of padding, compared to when user data is also sent.

In cases where the UE is to send the SON report without user data, BS should know when the EDT are expected so that the BS can perform blind decoding. Thus in some examples there may be coordination between BS and UE as to when SON reports are to be sent as part of EDT. For example this coordination may be in terms of preamble and/or time and/or frequency resources. For example the BS may allocate a RACH occasion or time period. The BS may signal this time period to one or more UEs. According to some examples, during this allocated time period the BS may decode a plurality of TBSs. For example during this time period the BS may decode a plurality of "smaller" TBSs (i.e. those TBSs including SON reports but no user data). In some examples these plurality of smaller TBSs may be received from a plurality of different UEs.

According to some examples, when a UE wants or needs to send a SON report without accompanying user data, the UE can wait and send on the Msg3 resource for energy efficient transmission.

According to some examples, after the EDT the UE re-enters an idle state.

According to some examples, the UE will send the user data if there is user data to send, irrespective of whether SON measurement information can fit in the same message. That is in some examples, when user data and SON measurement are ready to be sent but they cannot both be accommodated in the same message (i.e. in the same transport block), then it is the SON measurement information that is dropped rather than the user data. Therefore in some examples it may be considered that the user data has a higher priority than the SON measurement information.

Figure 2:
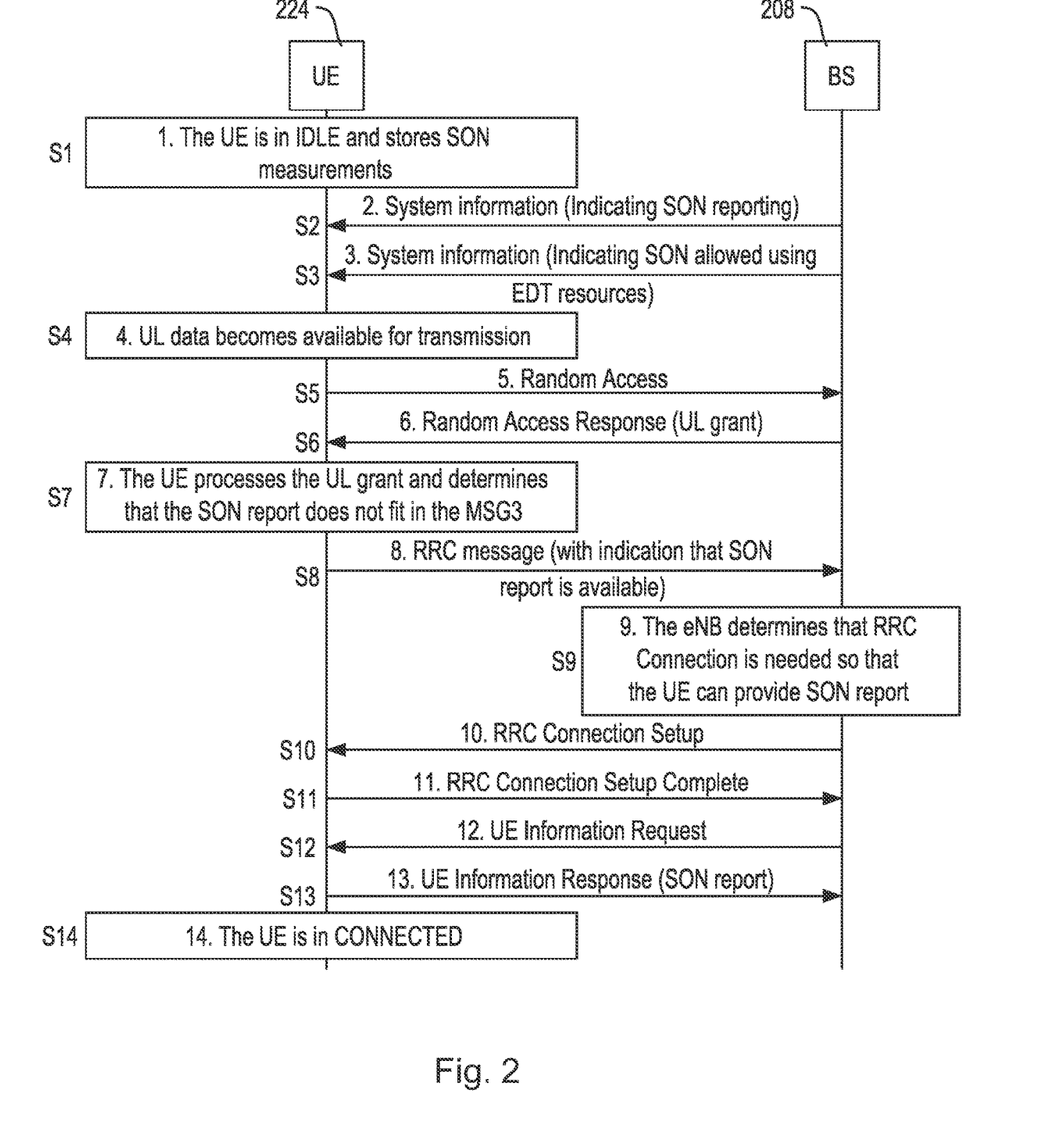
FIG. 2 is a signalling diagram schematically showing signalling between a UE and a base station according to an example.
Figure 3:
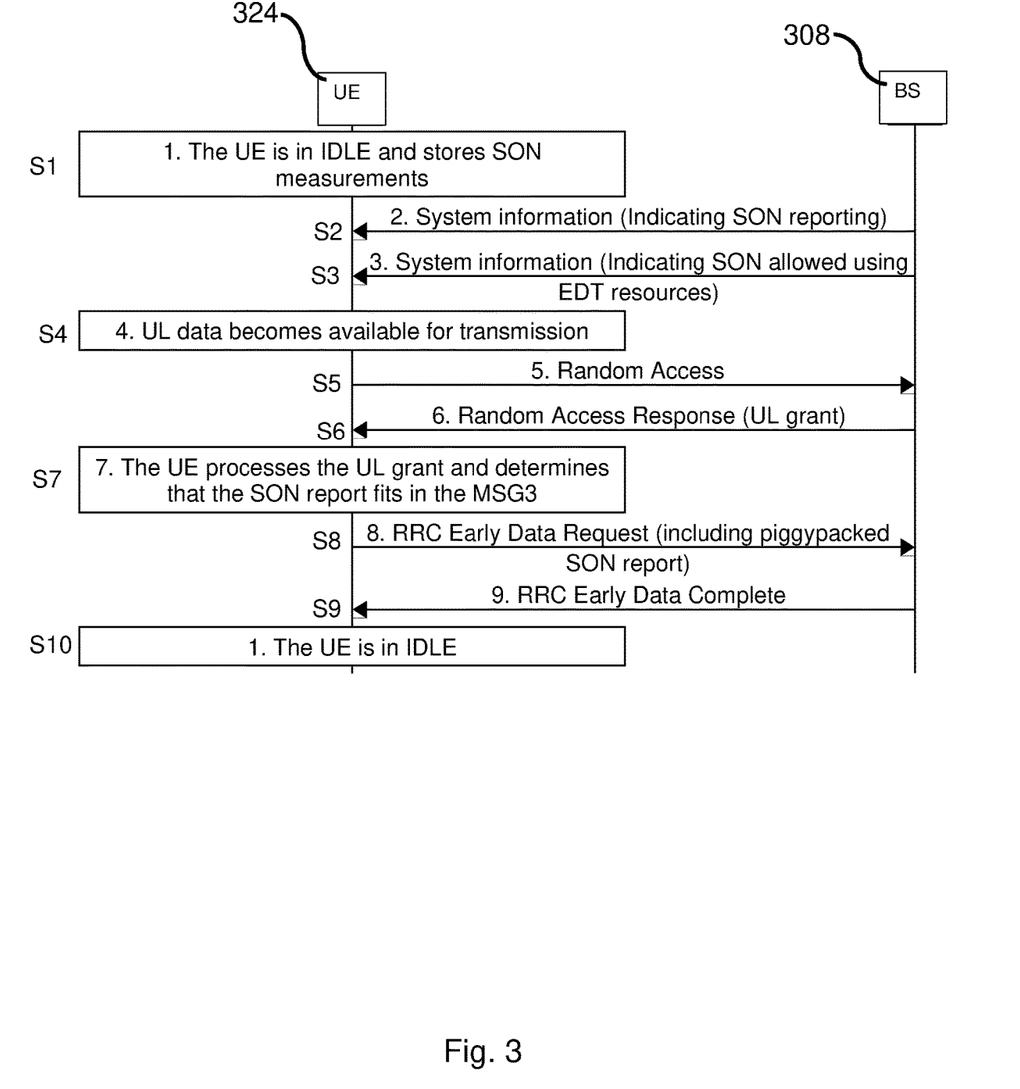
FIG. 3 is a signalling diagram schematically showing signalling between a UE and a base station according to an example.

Some more detailed examples are described with respect to the flow charts of FIGS. 2 and 3.

FIG. 2 is a signalling diagram schematically showing signalling between a UE 224 and a base station 208. The base station 208 may comprise an eNB for example. In the example of FIG. 2, the UE 224 is unable to accommodate the SON report with other UL data.

At S1, the UE is in an idle mode. Whilst in idle mode, the UE performs one or more SON measurements. The SON measurements that are performed may be based on the network configuration. The UE may store the SON measurements e.g. in a memory of the UE.

At S2, the BS 208 sends system information (SI) to UE 224. At least some of the system information may pertain to SON reporting.

At S3, the BS 208 informs the UE 224 that SON measurements can be transmitted using EDT UL resource (i.e. early data transmission uplink resource). The information sent by the BS 208 at S3 may be transmitted using dedicated and/or broadcast signalling.

The information sent at S3 may comprise an indication which indicates to the UE or informs the UE 224 whether SON measurement information can be included or padded among user data. For example the user data may be the user data which triggered the EDT procedure.

Alternatively, the information at S3 may comprise an indication of whether available SON measurements from UEs can or are allowed to trigger the EDT procedure.

In some examples S2 and S3 may be a single step.

As shown at S4, UL data becomes available for transmission.

At S5, the UE 224 initiates a random access procedure. As shown in FIG. 2, this includes sending a random access preamble to BS 208.

At S6, the BS 208 sends a random access response to UE 224. In some examples the random access response is sent comprising a UL grant.

At S7, the UE 224 processes the UL grant from the BS 208. In this example the processing comprises determining whether the SON report to be sent to the BS (i.e. report of SON measurements) fits in a message to be sent to the BS 208. In this example, at S7 it is determined that the SON report does not fit in the message. In some examples the message to be sent comprises a Msg3 message. Msg3 is part of the RA procedure in LTE. Msg3 may carry the RRC_connection_Request message, or RRC_Early_Data_Request message, or RRC_Connection_Resume_Request message from UE 224.

At S8, the UE 224 sends a message to BS 208 indicating that a SON report is available. In some examples the message at S8 comprises an RRC message. In some examples (e.g. for control plane (CP) EDT solution in NB-IoT) the RRC message comprises an RRC Early Data Request message. In some examples (e.g. for user plane (UP) EDT solution for NB-IoT) the RRC message comprises an RRC Connection Resume Request message. Therefore it will be understood that in some examples the RRC message used is dependent upon whether the UE triggers CP EDT or UP EDT.

From this, and as shown at S9, the BS 208 determines that RRC connection is needed so that the UE can provide the SON report.

Accordingly, at SW the BS 208 sends an RRC connection set-up message, or RRC connection resume message, to UE 224.

In response to this, the UE 224 performs RRC connection set-up or resume and at S11 the UE sends an RRC connection set-up complete message or RRC connection resume complete message to BS 208.

At S12, the BS 208 sends a request for information to the UE 224. In some examples this may be a request for any information that the UE stores. Additionally or alternatively the request at S12 may specifically be a request for the SON report from the UE.

The UE 224 receives and processes this request, and as shown at S13 the UE sends a response to the BS 208. The response at S13 comprises the SON report.

The UE 224 may then be placed in the connected state, as shown at S14.

FIG. 3 is a signalling diagram schematically showing signalling between a UE 324 and a base station 308. The base station 308 may comprise an eNB for example. In the example of FIG. 3, the UE 324 is able to accommodate the SON report with other UL data.

At S1, the UE 324 is in an idle mode. Whilst in idle mode, the UE performs one or more SON measurements. The SON measurements that are performed may be based on the network configuration. The UE 324 may store the SON measurements e.g. in a memory of the UE.

At S2, the BS 308 sends SON reporting information to UE 324. This may be part of a system information (SI) message.

At S3, the BS 308 informs the UE 324 that SON measurements can be transmitted using EDT UL resource (i.e. early data transmission uplink resource). The information sent by the BS 308 at S3 may be transmitted using dedicated and/or broadcast signalling).

The information sent at S3 may comprise an indication which indicates to or informs the UE 324 whether SON measurement information can be included or padded among user data. For example the user data may be the user data which triggered the EDT procedure.

Alternatively, the information at S3 may comprise an indication of whether available SON measurements from UEs can or are allowed to trigger the EDT procedure.

In some examples S2 and S3 may be a single step.

As shown at S4, UL data becomes available for transmission from the UE 324.

At S5, the UE 324 initiates a random access procedure. As shown in FIG. 3, this includes sending a random access preamble to BS 308.

At S6, the BS 308 sends a random access response to UE 324. In some examples the random access response is sent comprising a UL grant.

At S7, the UE 324 processes the UL grant from the BS 308. In this example the processing comprises determining whether the SON report to be sent to the BS (i.e. report of SON measurements) fits in a message to be sent to the BS 308. Accordingly part of S7 may involve determining a size of the SON report. In this example, at S7 it is determined that the SON report does fit in the message. In some examples the message to be sent comprises a Msg3 message. Msg3 is part of the RA procedure in LTE. Msg3 may carry the RRC_connection_Request message or RRC_Early_Data_Request message or RRC_Connection_Resume_Request message from UE 324.

At S8 the UE 324 sends a message to the BS 308. The message sent at S8 comprises the SON report. Accordingly it may be considered that the SON report is "piggybacked" on the message of S8. The message at S8 may comprise a RRC early data request message or an RRC Connection Resume Request message.

The BS 308 then completes the RRC procedure, and as shown at S9 the BS 308 sends an RRC early data complete message or RRC Connection Release message to UE 324.

The UE 324 then returns to an idle state, as shown at S10. Or it may be considered that the UE loops back to S1.

Some aspects of the signalling diagrams of FIGS. 2 and 3 will now be discussed in more detail.

As shown at S1 in FIGS. 1 and 2 the UE can perform SON measurements. In some examples the network may configure EDT capable UEs to perform SON measurements and reporting. For example BS 208/308 may configure UE 224/324 to perform the SON measurements and reporting. The configuration can be provided in a broadcast message, for example in management based MDT. Additionally or alternatively the configuration can be provided by dedicated signalling, for example for signalling based MDT.

In one example the configuration may inform the UE whether SON reporting is to be activated e.g. to indicate SON reporting on/off. In one example the configuration may provide conditions to the UE for SON reporting. These conditions may be considered triggering conditions for triggering SON reporting. For example the conditions may comprise a condition for periodical measurements e.g. indicating to the UE when to take SON measurements. Additionally or alternatively the conditions may comprise a condition for periodical reporting e.g. indicating to the UE when to report the SON measurements.

Where a UE has capability for reporting SON measurements along with user data (i.e. padded SON reporting) using EDT resources, the UE may trigger the EDT procedure upon user data arrival. In some examples the UE triggers the EDT procedure in a coverage enhancement (CE) level upon data arrival.

As shown at S6 in FIGS. 2 and 3, the BS 208/308 provides a UL grant to UE 224/324. The UL grant may be provided in a Msg2 format to the UE.

As shown at S7 in FIGS. 2 and 3, the UE 224/324 carries out a determination of whether the SON measurements (e.g. in the form of a SON report) can be transmitted together with user data.

According to one example, it is determined that SON measurements can be sent together with user data when the total size (SON measurement information plus user data) is less than a threshold size. According to one example the threshold size is a maximum allowable transport block size (TBS). The maximum allowable TBS may be a maximum allowable TBS for the current or a given CE level.

When the total size of the SON measurement information and the user data is within the threshold size, then the UE may send the SON measurement information and the user data together to the BS. For example the information may be sent in a Msg3 message. This is shown at S8. After the SON measurement information and user data has been received at the BS, the BS may then cause the UE to return to an idle mode.

Alternatively, if it is determined that the total size of the SON measurement information and the user data exceeds the threshold size, then the UE determines that the SON measurement information and the user data cannot be sent together. This is shown for example at S7 in FIG. 2. In some examples, when it is determined by the UE that the SON measurement information and the user data cannot be sent together, then the user data is sent along with an indication that there is SON measurement information to send. This is shown for example at S8 in FIG. 2. According to an example, the indication that there is SON measurement information to send may be included in an RRC message. For example the RRC message may comprises an RRC early data request or an RRC Connection Resume Request. Alternatively the indication that there is SON measurement information available may be included in a MAC CE (Media Access Control Element). The message comprising the indication that there is SON measurement information to send may comprise the Msg3 message. The BS may then move the UE to connected mode and subsequently retrieve the SON measurement information. Alternatively the BS may move the UE to idle mode if the BS doesn't require the SON measurement information. This may be dependent upon BS configuration.

According to some examples, for SON triggered EDT, when a reporting condition is met, the UE triggers EDT even when there is no user data available. For example when periodical SON reporting is configured, the reporting condition may be met when the periodical timer expires. Therefore the SON measurement information can be sent when there is no user data to send. In other words it may be considered that when there is no user data to send, the SON measurement information can be sent independently of the user data. This means that a delay is not incurred waiting for user data before sending SON measurement information which is ready to send. When there is no user data to send, in some examples the SON measurements are sent (e.g. in Msg 3) so long as the information does not exceed the maximum TBS of the current CE level. When the SON measurement information exceeds the maximum TBS, the EDT procedure may be aborted.

According to some examples, a maximum TBS size for SON reporting is configured by the base station (e.g. base station 208/308). According to some examples the configuring a maximum TBS size comprises selecting the maximum TBS size from amongst a plurality of available TBS sizes. According to some examples the BS configures the maximum TBS size for SON reporting when a smallest TBS size configured for EDT is higher than the maximum TBS size for SON Zo measurement information reporting. In some examples the "smallest" TBS size configured for EDT comprises a TBS size from amongst a plurality of TBS sizes used for EDT. Therefore it may be considered that in some examples the BS configures the maximum TBS that can be used for SON measurement information reporting, taking in to account the TB sizes available for EDT.

According to some examples, the smallest TBS size available for EDT may be suitable for accommodating SON measurement information, but the smallest TBS size available may be insufficiently large for accommodating user data and SON measurement information.

In some examples the BS may configure specific NPRACH resource opportunities and also preambles within EDT preambles where the UE can send a small TBS size. In some examples the BS may attempt blind decoding for any additional size over the "small" size (for example only on specific resources). This mechanism may avoid the UE selecting a TBS size which is unnecessarily large to accommodate the SON report and the additional "padded" bits for transmission.

Figure 4:
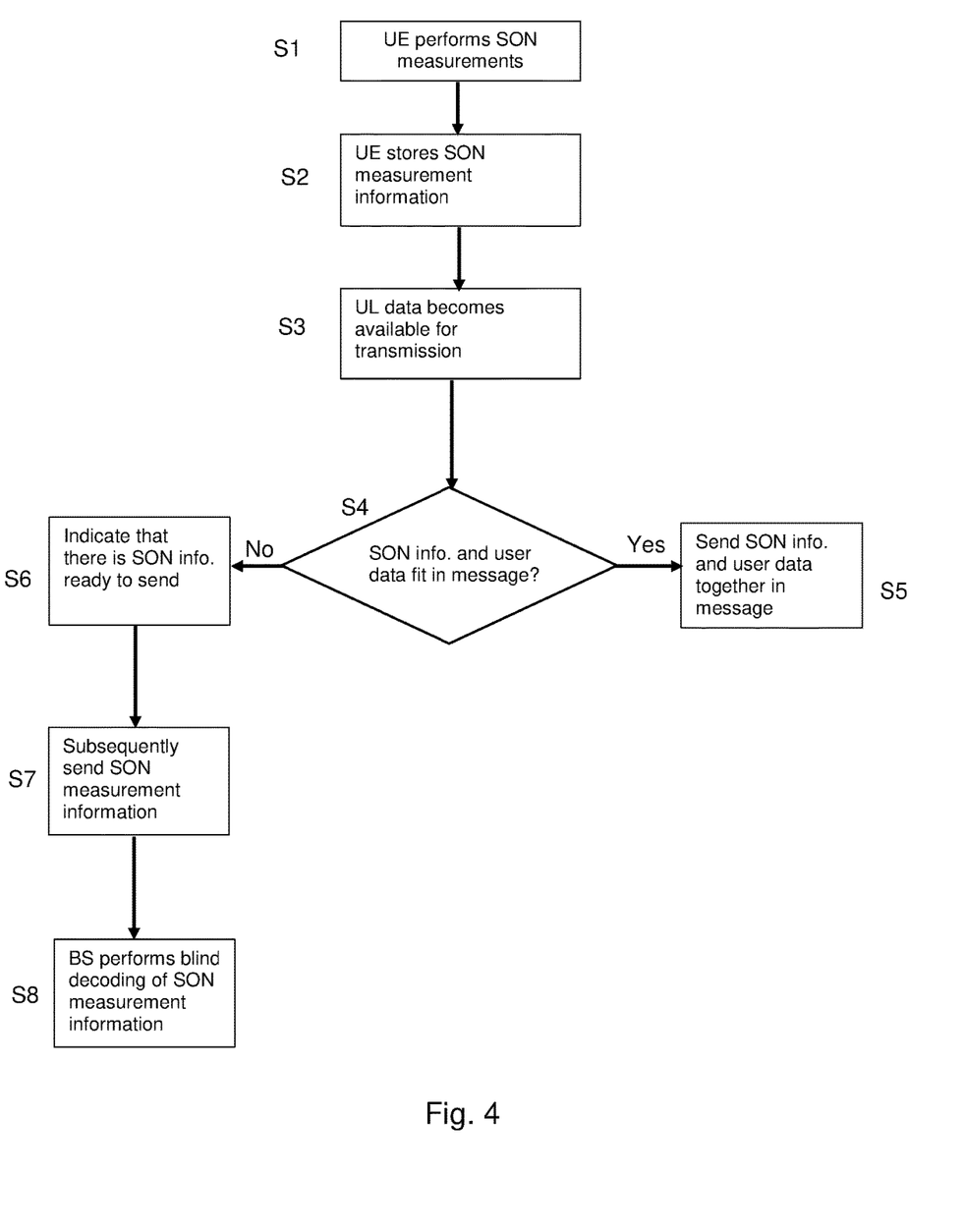
FIG. 4 is a flow chart of a method according to an example.

FIG. 4 is a flow chart of a method according to some examples.

At S1, a UE performs SON measurements.

From those SON measurements, at S2 the UE stores SON measurement information.

At S3, UL data becomes available for transmission from the UE.

At S4, the UE carries out a determination as to whether the UL data and the SON measurement information can be transmitted together in a message. The message may be a Msg3 message.

When the determination at S4 is "yes", the UE subsequently sends the SON measurement information and the user data together in the Msg3 message. This is shown at S5.

When the determination at S4 is "No", in the Msg3 the UE transmits an indication to the BS that there is SON measurement information ready to send. This is shown at S6. Therefore at S6, in Msg3 the UE transmits the user data and the indication that there is SON measurement information ready to send (without actually sending the SON measurement information).

According to some examples, the UE sends the SON measurement information to the BS at a subsequent time. This is shown at S8. As explained above, this may be a predetermined time. The predetermined time may be specified by the BS. In some examples the BS configures the UE to periodically send SON measurement information.

As shown at S8, the BS may perform blind decoding of received SON measurement information. In some examples the BS performs blind decoding of SON measurement information received from multiple UEs.

Figure 5:
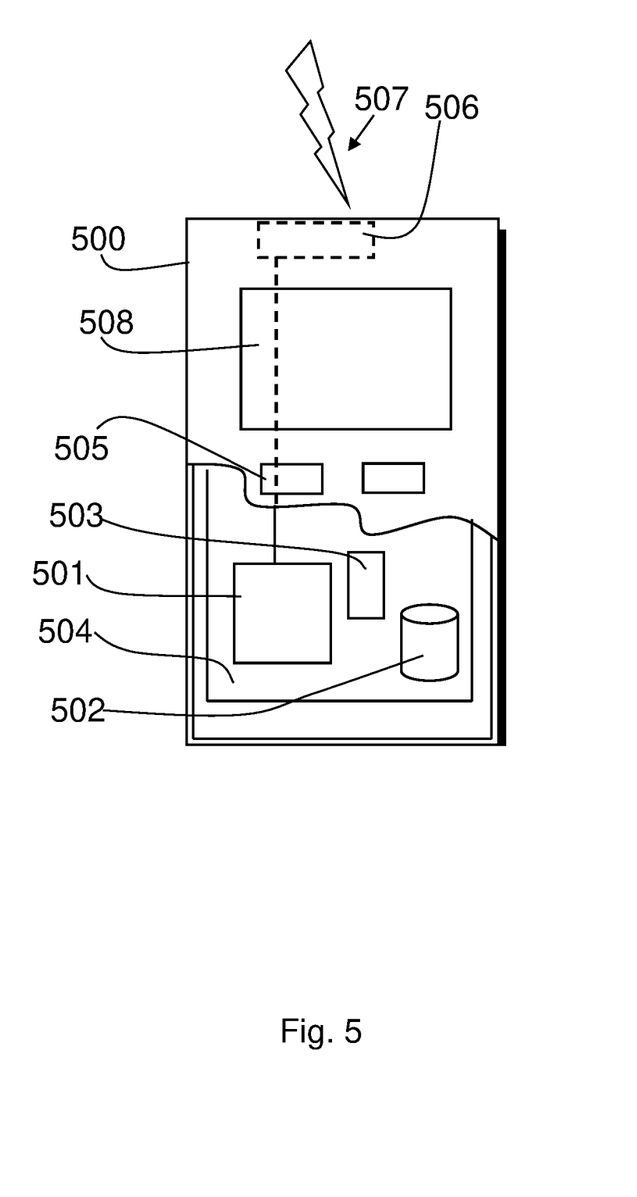
FIG. 5 schematically shows some aspects of an apparatus according to an example.

A possible wireless communication device will now be described in more detail with reference to FIG. 5 showing a schematic, partially sectioned view of a communication device 500. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 500 may receive signals over an air or radio interface 507 via appropriate apparatus for receiving and may transmit signals via appropriate apparatus for transmitting radio signals. In FIG. 5 transceiver apparatus is designated schematically by block 506. The transceiver apparatus 506 may be provided for example by means of a radio part and associated antenna arrangement. The antenna arrangement may be arranged internally or externally to the wireless device.

A wireless device is typically provided with at least one data processing entity 501, at least one memory 502 and other possible components 503 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 504. The user may control the operation of the wireless device by means of a suitable user interface such as key pad 505, voice commands, touch sensitive screen or pad, combinations thereof or the like. A display 508, a speaker and a microphone can be also provided. Furthermore, a wireless communication device may comprise appropriate connectors (either wired or wireless) to other devices and/or for connecting external accessories, for example hands-free equipment, thereto.

Figure 6:
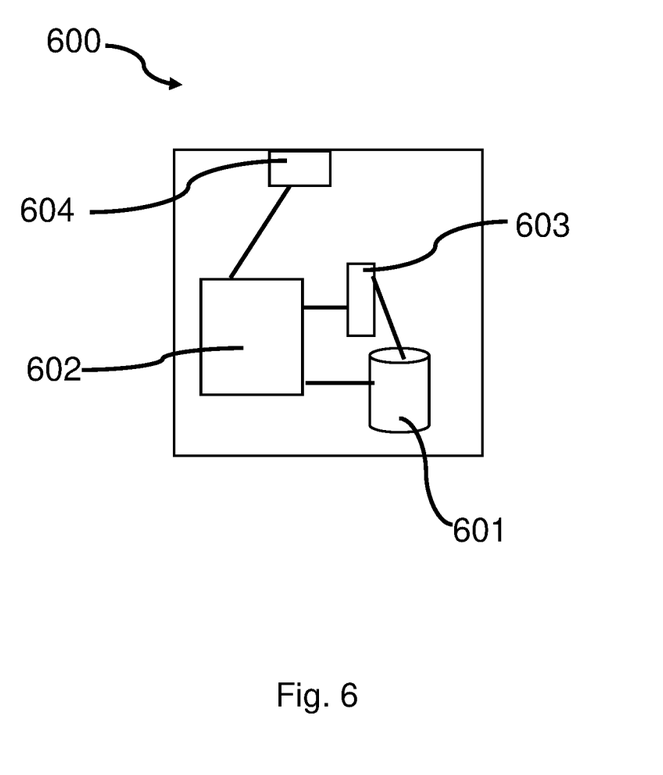
FIG. 6 schematically shows some aspects of an apparatus according to an example.

FIG. 6 shows an example of a control apparatus for a communication system, for example to be coupled to and/or for controlling a station of an access system, such as a RAN node, e.g. a base station, eNB or gNB, a central unit of a cloud architecture or a node of a core network such as an MME or S-GW, a scheduling entity such as a spectrum management entity, or a server or host. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 600 can be arranged to provide control on communications in the service area of the system. The control apparatus 600 comprises at least one memory 601, at least one data processing unit 602, 603 and an input/output interface 604. Via the interface the control apparatus can be coupled to a receiver and a transmitter of the base station. The receiver and/or the transmitter may be implemented as a radio front end or a remote radio head. For example the control apparatus 600 or processor 601 can be configured to execute an appropriate software code to provide the control functions.

Figure 7:
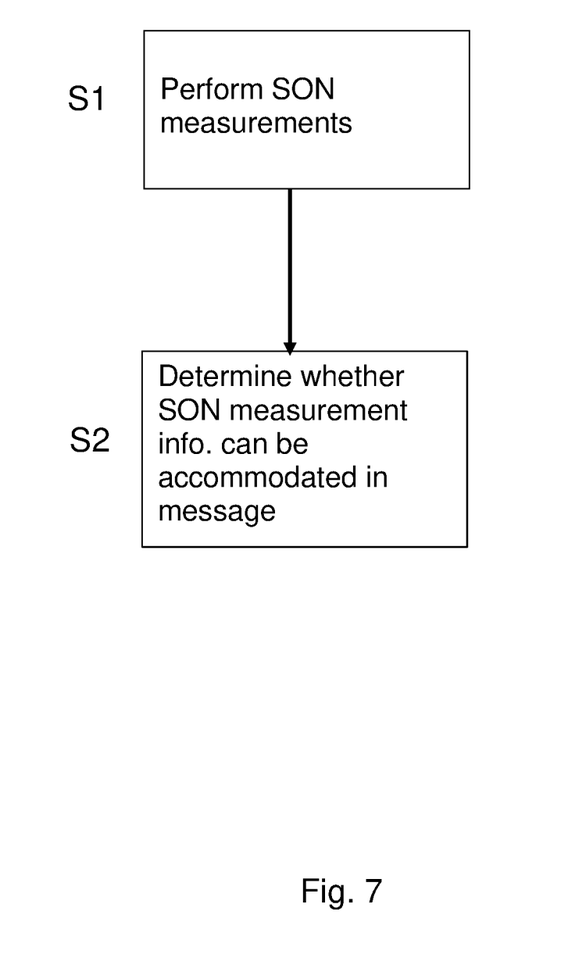
FIG. 7 schematically shows a method according to an example.

FIG. 7 is a flow chart of a method according to an example. The method of FIG. 7 may be carried out by an apparatus. In some examples the apparatus comprises a user equipment.

At S1, the method comprises performing self-organizing network measurements at the apparatus to generate self-organizing network measurement information.

At S2, in response to determining that the apparatus has user data to transmit to a base station, the method comprises determining whether the self-organizing network measurement information can be accommodated in a message together with the user data.

Figure 8:
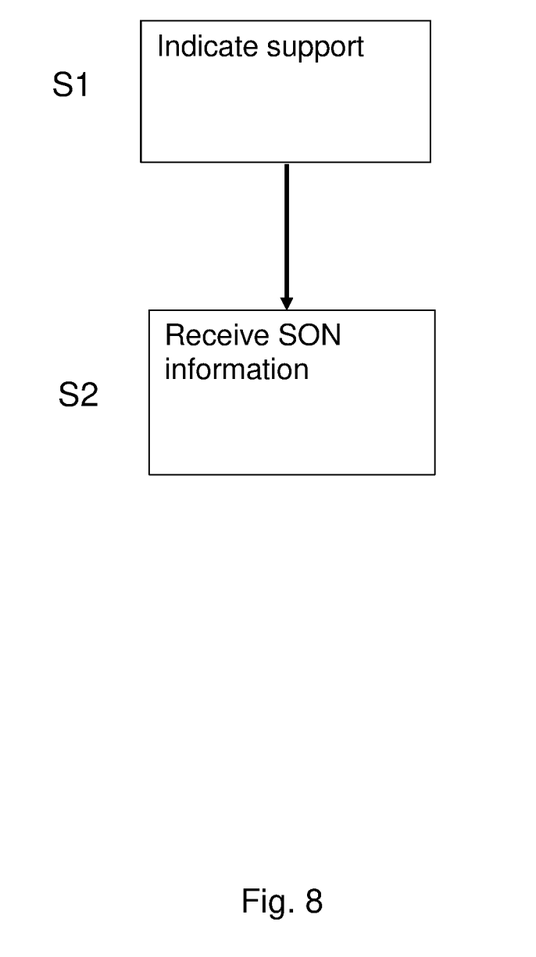
FIG. 8 schematically shows a method according to an example.

FIG. 8 is a flow chart of a method according to an example. The method of FIG. 8 may be carried out by an apparatus. In some examples the apparatus comprises a base station.

At S1, the method comprises indicating by an apparatus to a user equipment that reporting by the user equipment of self-organizing network measurement information together in a message with user data is supported by the apparatus.

At S2, in response to the indicating, the method comprises receiving self-organizing network information from the user equipment.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. An apparatus, comprising:
    at least one processor; and
    at least one memory including computer program code,
    wherein the at least one memory and the computer program code are configured to, with the at least one processor, cause the apparatus at least to:
    receive, from a base station, an indication that reporting by the apparatus of self-organizing network measurement information in a message together with user data is supported by the base station;
    perform self-organizing network measurements to generate the self-organizing network measurement information; and
    in response to determining that the apparatus has user data to transmit to the base station, determine whether the self-organizing network measurement information can be accommodated in the message together with the user data, wherein it is determined that the self-organizing network measurement information can be accommodated in the message together with the user data when a total size of the self-organizing network measurement information and the user data is within an allocated transport block size for the message; and
    send the user data and the self-organizing network measurement information together in the message to the base station, when it is determined that the self-organizing network measurement information can be accommodated in the message together with the user data.

2. The apparatus of claim 1, wherein the at least one memory and the computer program code are further configured to, with the at least one processor, cause the apparatus to:
    compare the total size of the self-organizing network measurement information and the user data with the allocated transport block size for the message, when determining whether the self-organizing network measurement information can be accommodated in the message together with the user data.

3. The apparatus of claim 1, wherein the at least one memory and the computer program code are further configured to, with the at least one processor, cause the apparatus to:
    send an indication to the base station that the apparatus has self-organizing network measurement information to send, without sending the self-organizing network measurement information along with the indication, when it is determined that the self-organizing network measurement information cannot be accommodated in the message together with the user data.

4. The apparatus of claim 1, wherein the at least one memory and the computer program code are further configured to, with the at least one processor, cause the apparatus to:
    in response to determining that the apparatus has no user data to transmit to a base station, send the self-organizing network measurement information to the base station at a predetermined time as part of an early data transmission.

5. The apparatus of claim 1, wherein the message comprises a radio resource control early data request message, or a radio resource control connection resume request message, or a media access control element, sent as part of early data transmission.

6. The apparatus of claim 1, wherein the self-organizing network comprises a narrowband internet of things network.

7. An apparatus, comprising:
    at least one processor; and
    at least one memory including computer program code,
    wherein the at least one memory and the computer program code are configured to, with the at least one processor, cause the apparatus at least to:
    send to a user equipment an indication that reporting by the user equipment of self-organizing network measurement information together in a message with user data is supported by the apparatus; and in response to the indication, receive self-organizing network information together in the message with the user data from the user equipment, wherein the self-organizing network measurement information can be accommodated in the message together with the user data when a total size of the self-organizing network measurement information and the user data is within an allocated transport block size for the message.

8. The apparatus of claim 7, wherein the indication to the user equipment comprises indicating one or more report types to the user equipment, the one or more report types comprising information of a preference of the apparatus for receiving the self-organizing network measurement information.

9. The apparatus of claim 7, wherein the at least one memory and the computer program code are further configured to, with the at least one processor, cause the apparatus to:
receive the message as a radio resource control early data request message, or a radio resource control connection resume request message, or a media access control control element, received as part of early data transmission.

10. The apparatus of claim 7, wherein the at least one memory and the computer program code are further configured to, with the at least one processor, cause the apparatus at least to:
receive from the user equipment an indication that the user equipment has self-organizing network measurement information to send, without receiving the self-organizing network measurement information along with the indication.

11. The apparatus of claim 7, wherein the at least one memory and the computer program code are further configured to, with the at least one processor, cause the apparatus to:
configure a maximum transport block size for reporting of the self-organizing network measurement information, the configuring a maximum transport block size comprising selecting the maximum transport block size from a plurality of available transport block sizes.

12. The apparatus of claim 7, wherein the at least one memory and the computer program code are further configured to, with the at least one processor, cause the apparatus to:
blindly decode the received self-organizing network measurement information.

13. The apparatus of claim 7, wherein the at least one memory and the computer program code are further configured to, with the at least one processor, cause the apparatus to:
blindly decode self-organizing network measurement information received from multiple user equipment.

14. A method comprising:
receiving, by a user equipment, from a base station an indication that reporting by the user equipment of self-organizing network measurement information in a message together with user data is supported by the base station;
performing self-organizing network measurements at the user equipment to generate the self-organizing network measurement information; and
in response to determining that the user equipment has user data to transmit to the base station, determining whether the self-organizing network measurement information can be accommodated in the message together with the user data, wherein it is determined that the self-organizing network measurement information can be accommodated in the message together with the user data when a total size of the self-organizing network measurement information and the user data is within an allocated transport block size for the message; and
sending the user data and the self-organizing network measurement information together in the message to the base station, when it is determined that the self-organizing network measurement information can be accommodated in the message together with the user data.

15. The method of claim 14, further comprising comparing the total size of the self-organizing network measurement information and the user data with the allocated transport block size for the message, when determining whether the self-organizing network measurement information can be accommodated in the message together with the user data.

16. The method of claim 14, further comprising sending by the apparatus an indication to the base station that the user equipment has self-organizing network measurement information to send, without sending the self-organizing network measurement information along with the indication, when it is determined that the self-organizing network measurement information cannot be accommodated in the message together with the user data.

* * * * *